United States Patent [19]

Lüthi

[11] 4,074,544
[45] Feb. 21, 1978

[54] HEATING DEVICES FOR THE HEAT TREATMENT OF TEXTILE FILAMENTS OR YARNS

[75] Inventor: Walter Lüthi, Ebnat-Kappel, Switzerland

[73] Assignee: Heberlein Maschinenfabrik AG, Switzerland

[21] Appl. No.: 764,240

[22] Filed: Jan. 31, 1977

[30] Foreign Application Priority Data

Feb. 12, 1976 Switzerland .......................... 1704/76
Apr. 26, 1976 Switzerland .......................... 5196/76

[51] Int. Cl.² .......................................... D06B 23/18
[52] U.S. Cl. ...................................... 68/5 E; 34/242; 68/DIG. 1
[58] Field of Search .................. 68/6, 5 E, DIG. 1; 34/242

[56] References Cited

U.S. PATENT DOCUMENTS

| | | | |
|---|---|---|---|
| 1,514,061 | 11/1924 | McEnaney | 68/6 |
| 2,317,448 | 4/1943 | Dreyfus et al. | 68/5 E |
| 2,954,687 | 10/1960 | Yazawa et al. | 68/5 E |
| 3,240,037 | 3/1966 | Bittle et al. | 68/5 E |

Primary Examiner—Philip R. Coe
Attorney, Agent, or Firm—Larson, Taylor and Hinds

[57] ABSTRACT

The yarn entry and exit openings in a container for high pressure gaseous or liquid yarn heating medium are each sealed by means of a plunger mounted to slide in a cylinder extending from the opening. Each plunger is formed with a longitudinal groove of U-shaped cross-section on its surface. Therefore, to thread the yarn, it is only necessary to withdraw the plungers from their cylinders, place the yarn in the grooves and replace the plungers. Substantially to eliminate the escape of medium along the grooves, each may have a depth substantially equal to its width and amounting to between 0.1 mm and 0.5 mm, according to the yarn. However, to accommodate yarn with knots along its length or strechable yarn, this dimension may be increased and the pressure of any escaping medium reduced in a stepwise manner by recesses distributed along the plunger and intersecting the groove, into which recesses any escaping medium can expand.

7 Claims, 9 Drawing Figures

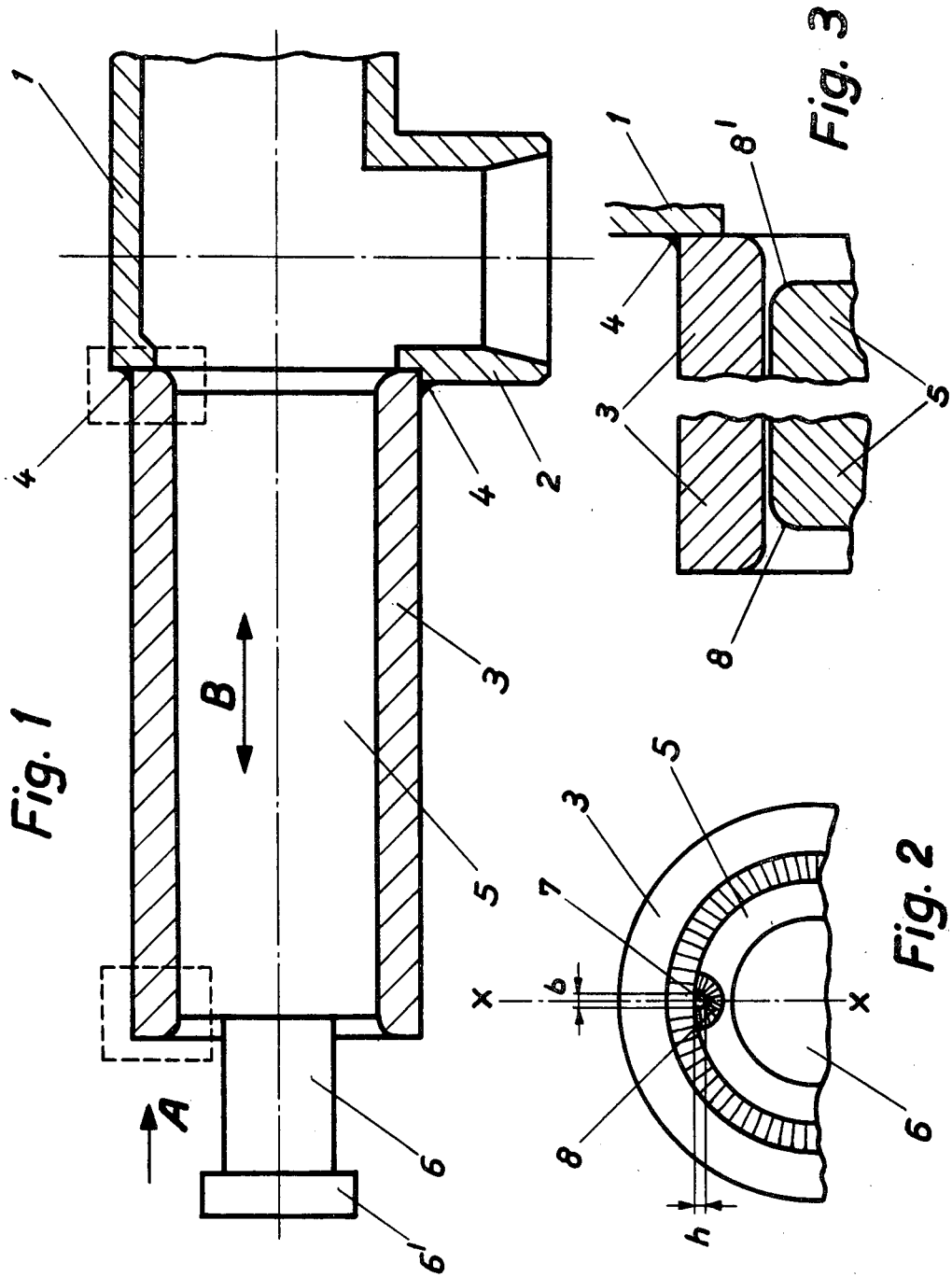

HEATING DEVICES FOR THE HEAT TREATMENT OF TEXTILE FILAMENTS OR YARNS

FIELD OF THE INVENTION

The present invention relates to heating devices for the heat treatment of textile filaments or yarns, particularly those of synthetic thermoplastic material such as polyamides or polyesters.

DESCRIPTION OF THE PRIOR ART

Heating devices are known which consist of a cylindrical container which contains a heating medium, for example saturated steam under superatmospheric pressure and through which the textile yarn passes in an axial direction. On the end faces of the container, there are provided sealing devices each of which consists, for example, of a capillary tube or alternatively a metallic cylinder with a capillary bore, the inner diameter of the capillary tube or alternatively the diameter of the capillary bore being approximately 0.5 mm.

These known sealing devices have various disadvantages. First, the manufacture of capillary bores of very small diameter in metal cylinders causes considerable difficulties. Also, the insertion of textile yarns into such capillary bores is very complicated and takes much time. Furthermore, depending on the pressure of the heating medium in the container, the losses of heating medium may still be considerable even with capillary bores of a diameter as small as 0.5 mm.

SUMMARY OF THE INVENTION

It is the purpose of the present invention to eliminate these disadvantages and to provide a sealing device for a heating device of the above-described kind in which the yarn can be introduced very quickly and without difficulty and in which the losses of heating medium are reduced to a minimum.

Therefore the present invention, according to one aspect thereof, consists in a sealing device for a heating device for the heat treatment of textile filaments and yarns consisting of a cylindrical container, through which the yarn can be passed in an axial direction, adapted to contain a gaseous or liquid heating medium under superatmospheric pressure, which is characterized in that, on each of the end faces of the container, there is fixed in a gas-tight and fluid-tight way a hollow cylindrical part in which a cylindrical plunger can be shifted like a piston and in that the plunger comprises a groove of a U-shaped cross-section extending along a surface line on the plunger, the depth and width of the U-shaped cross-section being at least approximately equal and preferably amounting to between 0.1 mm and 0.5 mm inclusive.

With this sealing device, the losses of heating medium can be minimized even with heating medium pressures of up to 25 atmospheres and more. In certain cases however, where the textile yarns being passed through the heating device present knots with approximately six times the normal yarn titer, the cross-section of the U-shaped groove must be enlarged accordingly so that its depth and the width thereof may amount to more than 0.5 mm. The same is also true in cases where unstretched synthetic yarns are passed through the heating device and stretched in the heating device, the initial titer of the unstretched synthetic filaments being up to four times the final titer of the stretched yarn. In these cases, especially with relatively high pressures of the heating medium in the container, the losses of heating medium may tend to exceed the economically admissible limits.

According to a further feature of the invention, therefore, this disadvantage is avoided by forming the plunger with recesses distributed along the length of the plunger at determined distances from each other and extending transversely with respect to the axis of the plunger, said recesses being connected with the U-shaped groove.

By these means, the pressure of any heating medium flowing out of the container along the U-shaped groove is reduced in a stepwise manner by the recesses which are arranged in sequence along the plunger so that disadvantageous medium losses can be avoided even when the aforesaid U-shaped cross-section is somewhat larger than 0.5 mm.

DESCRIPTION OF THE DRAWINGS

Examples of the present invention will now be described in a more detailed manner with reference to the accompanying drawings, wherein:

FIG. 1 is a lateral elevation of a sealing device, shown partially in longitudinal section;

FIG. 2 is a front elevation of part of the sealing device of FIG. 1 as seen in the direction of arrow A and on a larger scale;

FIG. 3 is a longitudinal section showing details of the device of FIG. 1 on a still larger scale, the section being taken on the line X—X in FIG. 2.

FIG. 1 shows a part of a cylindrical container 1 with a connection nozzle 2 for feeding heating medium, for example steam, into the container. On the container 1, a cylinder 3 is fixed by means of hard solder 4, that provides a joint that is both gas tight and fluid tight. In the cylinder 3 a plunger 5 can be shifted to and fro in the direction of double arrow B by means of a handle 6.

As shown in FIG. 2, the plunger 5 has on its surface a groove 7 of U-shaped cross-section extending along the plunger. The depth $h$ and the width $b$ of the groove are equal and amount to 0.1 mm.

In FIG. 3, the parts of the sealing device framed in FIG. 1 by dashed lines are shown on a larger scale, the plunger 5 being shown in section through groove 7 on line X—X in FIG. 2. As shown, each of the two ends of the groove 7 is flared radially outwards to provide a trumpet-shaped expansion 8, 8' which prevents the yarn from being damaged by friction on the plunger 5 when entering the groove 7 and when leaving the groove.

The sealing device (not shown) at the other end of the container 1 is shaped similarly. When introducing the yarn into the heating device, the plungers 5 are first completely pulled out of their cylinders 3, the yarn passing through container 1 is inserted into the grooves 7 and then the plungers are pushed into the cylinders.

By means of this sealing device, it is therefore possible to insert the yarn into the heating device rapidly and without difficulty. Moreover, this sealing device does not involve any manufacturing difficulties. It is possible to make without any difficulties, grooves with diameters of only 0.1 mm so that, even with relatively high pressures of the heating medium in the container 1 of up to 25 atmospheres and more, the losses of heating medium are minimized.

Figure 4:
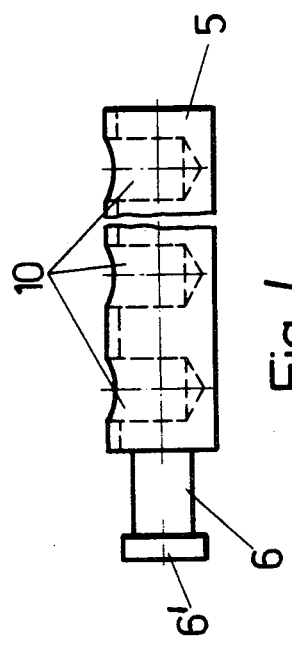
FIG. 4 shows a central longitudinal section of a modified form of plunger for use in the device of FIG. 1.
Figure 5:
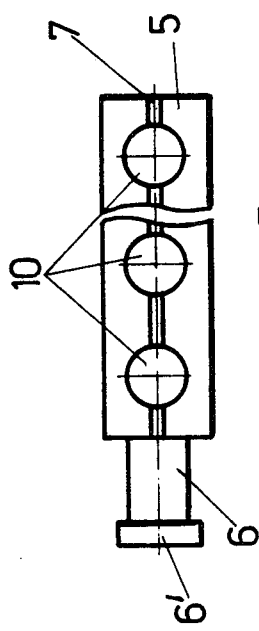
FIG. 5 is a plan view of the plunger shown in FIG. 4.

The modified form of plunger shown in FIGS. 4 and 5 comprises a plurality of cylindrical cavities 10 extending transversely with respect to the longitudinal axis of the plunger, and arranged at equal distances from each other, which intersect the U-shaped longitudinal groove 7 and the central axes of which join the longitudinal axis of groove 7.

Figure 6:
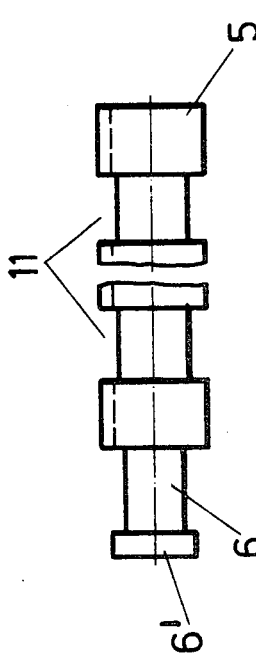
FIG. 6 shows a central longitudinal section of a second modification of a plunger for use in the device of FIG. 1.
Figure 7:
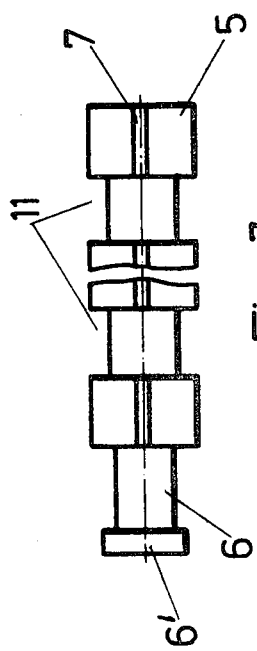
FIG. 7 is a plan view of the plunger shown in FIG. 6.

A plunger 5 having a plurality of ring-shaped grooves 11 arranged at equal distances from each other, is shown in FIGS. 6 and 7.

Figure 8:
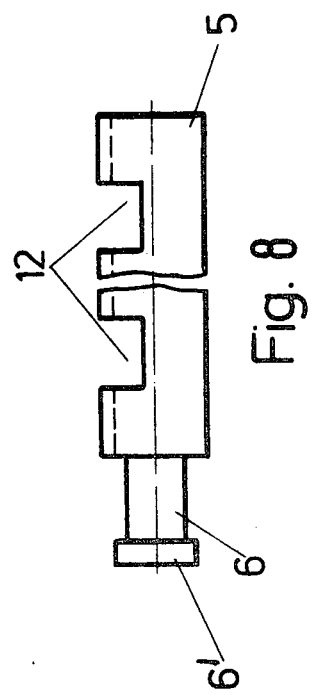
FIG. 8 is a central longitudinal section through a third modification of the plunger for use in the device of FIG. 1.
Figure 9:
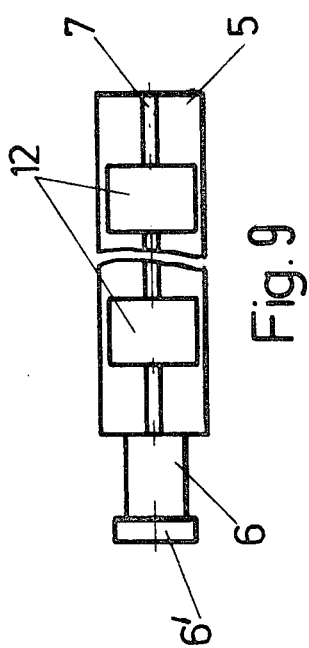
FIG. 9 is a plan view of the plunger shown in FIG. 8.

In the alternative plunger shown in FIGS. 8 and 9, a plurality of recesses 12 in the shape of cylindrical segments intersecting the groove 7 at their centres, are arranged on the plunger 5 at equal distances from each other.

In all three plungers of FIGS. 4 to 9, it is preferable to round off the edges formed where the groove 7 enters each recess 10, 11 or 12 and where it leaves the recess in order to avoid the yarn being damaged when passing through the groove.

It will be appreciated that any high pressure medium that escapes from the container 1 into the groove means constituted by the groove 7 interrupted by the recesses 10, 11 or 12 expands into the recesses whereby the pressure is reduced in a stepwise manner.

Obviously means are provided in practice for holding the plungers 5 in position within the cylinders 3 against the pressure of the fluid heating medium in the container 1 when the device is in operation.

I claim:

1. A heating device for the heat treatment of textile filaments and yarns comprising a container including first and second openings at opposite ends thereof, respectively for entry and exit of yarn passing through said container, said container being further formed with a port for the admission into said container of a fluid heating medium at superatmospheric pressure, first and second tubular extensions respectively sealingly connected to said opposite ends of said container so that each of the openings at each end of said container opens within the end of the tubular extension at that end, first and second plungers formed so as to provide a close sliding fit in respective ones of said first and second tubular extensions, each said plunger including a longitudinal surface having a groove arrangement therein of U-shaped cross-section and extending along at least a substantial portion of said plunger, the depth and width of the U-shaped cross-section being at least approximately equal and having a value of at least 0.1 mm, said groove arrangement being positioned for the passage of yarn from outside one of said tubular extensions along the groove arrangement in the plunger in that tubular extension, then through said container into the other said tubular extension and through the groove arrangement in the plunger in said last mentioned tubular extension to the outside thereof, said plungers substantially completely preventing the escape of heating medium from said container through said tubular extensions while yarn travels through said container and along said groove arrangement.

2. A device according to claim 1, in which said groove arrangement in at least one of said plungers is formed to terminate at each end of the plunger by way of a radially flared expansion to prevent the yarn from being damaged by friction on the plunger.

3. A device according to claim 1, in which at least one of said plungers is formed at spaced locations along its length with recesses opening transversely into the plunger from the surface thereof, said recesses being connected to said groove arrangement, whereby said groove arrangement comprises a plurality of aligned grooves of U-shaped cross-section and the pressure of any heating medium escaping from said container along said grooves is reduced stepwise by said recesses.

4. A device according to claim 3, in which said recesses are respectively constituted by cavities in the plunger intersecting said groove arrangement.

5. A device according to claim 3, in which said recesses are respectively constituted by annular grooves surrounding the plunger.

6. A device according to claim 3, in which said recesses are respectively constituted by openings in the form of segments of cylinders intersecting said groove means.

7. A device according to claim 1, in which said U-shaped cross-section has both a depth and width of a value between 0.1 mm and 0.5 mm inclusive.

* * * * *